United States Patent
Sato

(10) Patent No.: US 8,321,827 B2
(45) Date of Patent: Nov. 27, 2012

(54) POWER SUPPLY DESIGN

(75) Inventor: Mitsuru Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 466 days.

(21) Appl. No.: 12/693,439

(22) Filed: Jan. 25, 2010

(65) Prior Publication Data
US 2010/0191512 A1    Jul. 29, 2010

(30) Foreign Application Priority Data
Jan. 27, 2009   (JP) .................................. 2009-14923

(51) Int. Cl.
*G06F 17/50*   (2006.01)
(52) U.S. Cl. ........ 716/120; 716/118; 716/119; 716/127; 716/133; 703/1; 703/18
(58) Field of Classification Search .................. 716/118, 716/119, 120, 127, 133; 703/1, 18
See application file for complete search history.

(56) References Cited

U.S. PATENT DOCUMENTS

| | | | |
|---|---|---|---|
| 5,391,900 A * | 2/1995 | Onodera et al. ............... | 257/207 |
| 6,110,213 A * | 8/2000 | Vinciarelli et al. ............... | 703/1 |
| 6,477,694 B1 * | 11/2002 | Irino et al. ...................... | 716/115 |
| 6,496,964 B2 * | 12/2002 | Inui et al. ....................... | 716/103 |
| 6,526,561 B2 * | 2/2003 | Yokoyama et al. ............ | 716/104 |
| 6,842,727 B1 * | 1/2005 | Hayashi ........................... | 703/18 |
| 6,847,853 B1 * | 1/2005 | Vinciarelli et al. .............. | 700/97 |
| 7,024,649 B2 * | 4/2006 | Collmeyer et al. ............ | 716/139 |
| 7,444,526 B2 * | 10/2008 | Felter et al. .................... | 713/300 |
| 7,490,306 B2 * | 2/2009 | Nguyen et al. ................ | 716/115 |
| 7,552,404 B2 * | 6/2009 | Hirata ............................ | 716/100 |
| 7,624,365 B2 * | 11/2009 | Hirata ............................ | 716/120 |
| 7,631,279 B2 * | 12/2009 | Hirata ............................ | 716/106 |
| 7,665,049 B2 * | 2/2010 | Muranaka ....................... | 716/136 |
| 7,793,237 B2 * | 9/2010 | Bonaccio et al. .............. | 716/133 |

FOREIGN PATENT DOCUMENTS

| | | |
|---|---|---|
| JP | H05-225104 | 9/1993 |
| JP | 2000-322462 | 11/2000 |
| JP | 2001-339853 | 12/2001 |
| JP | 2003-167932 | 6/2003 |
| JP | 2004-215027 | 7/2004 |
| JP | 2009-003537 | 1/2009 |

OTHER PUBLICATIONS

"Japanese Office Action" mailed by JPO and corresponding to Japanese Application No. 2009-014923 on Aug. 14, 2012, with partial English translation.

* cited by examiner

*Primary Examiner* — Sun Lin
(74) *Attorney, Agent, or Firm* — Fujitsu Patent Center

(57) ABSTRACT

In one embodiment, there is provided a method for a computer aiding a design of a power supply that includes extracting data of one of a plurality of power supplies of an apparatus from product data about the apparatus, extracting data of a power supply system from power supply system data, the one of the plurality power supplies system is not allocated to any of the plurality of power supplies of the apparatus and associating the extracted data of the power supply with the extracted data of the power supply system in power supply allocation result data.

11 Claims, 12 Drawing Sheets

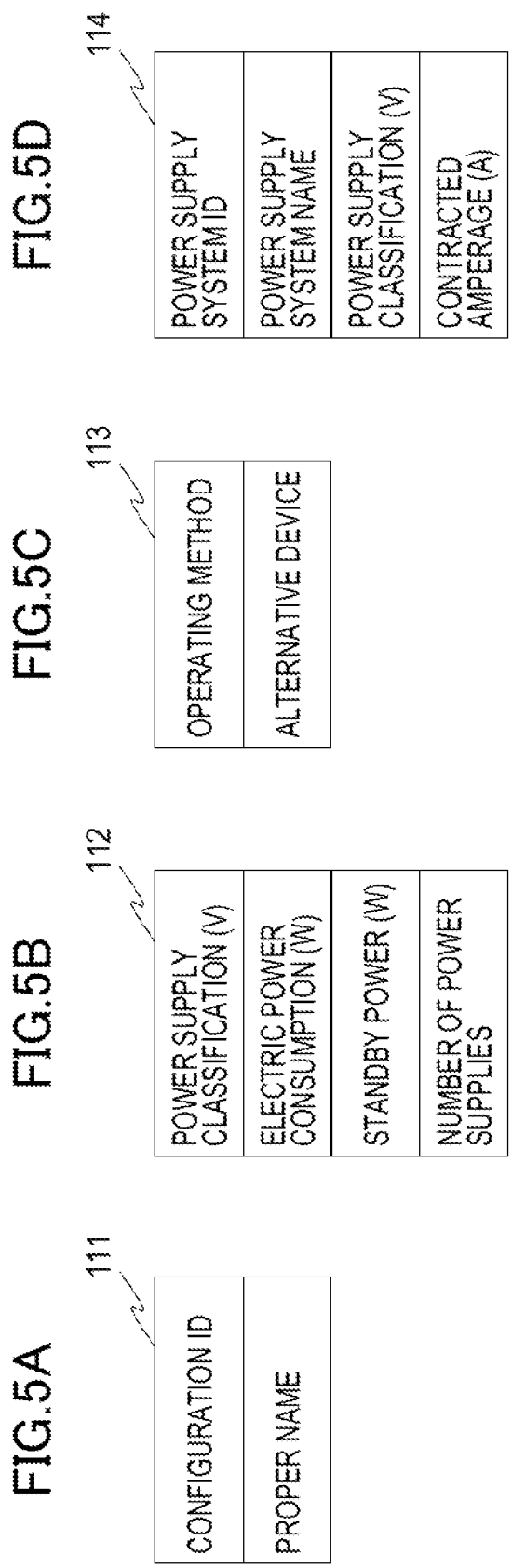

FIG.6

| CONFIGURA TION ID | PROPER NAME | POWER SUPPLY CLASSIFICATION (V) | ELECTRIC POWER CONSUMPTION (W) | STANDBY POWER (W) | NUMBER OF POWER SUPPLIES | CURRENT (A) | OPERATING METHOD | ALTERNATIVE DEVICE |
|---|---|---|---|---|---|---|---|---|
| 1 | XXX#1 | 200 | 500 | 10 | 2 | 4.2 | NORMAL OPERATION | XXX#2, XXX#3 |
| 2 | XXX#2 | 200 | 500 | 10 | 2 | 4.2 | HOT STANDBY | XXX#1 |
| 3 | XXX#3 | 200 | 450 | 10 | 2 | 0.1 | COLD STANDBY | XXX#1 |
| 4 | YYY#1 | 200 | 150 | 5 | 1 | 2.5 | NORMAL OPERATION | YYY#2 |
| 5 | YYY#2 | 200 | 150 | 5 | 1 | 2.5 | HOT STANDBY | YYY#1 |
| 6 | ZZZ#1 | 200 | 350 | 8 | 1 | 5.8 | NORMAL OPERATION | ZZZ#3 |
| 7 | ZZZ#2 | 200 | 350 | 8 | 1 | 5.8 | NORMAL OPERATION | ZZZ#3 |
| 8 | ZZZ#3 | 200 | 300 | 7 | 1 | 5.0 | HOT STANDBY | ZZZ#1, ZZZ#2 |

| PROPER NAME | APPARATUS ELECTRIC POWER CONSUMPTION (W) | ELECTRIC POWER CONSUMPTION (W) | STANDBY POWER (W) | OPERATING METHOD | PROCESSED NUMBER OF POWER SUPPLIES |
|---|---|---|---|---|---|
| XXX#1 | 500 | 500 | 10 | NORMAL OPERATION | 0 |
| XXX#2 | 500 | 500 | 10 | HOT STANDBY | 0 |
| ZZZ#1 | 350 | 350 | 8 | NORMAL OPERATION | 0 |
| ZZZ#2 | 350 | 350 | 8 | NORMAL OPERATION | 0 |
| ZZZ#3 | 300 | 300 | 7 | HOT STANDBY | 0 |
| YYY#1 | 150 | 150 | 5 | NORMAL OPERATION | 0 |
| YYY#2 | 150 | 150 | 5 | HOT STANDBY | 0 |
| XXX#3 | 10 | 450 | 10 | COLD STANDBY | 0 |

FIG.8

| PROPER NAME | POWER SUPPLY SYSTEM #1 | POWER SUPPLY SYSTEM #2 | POWER SUPPLY SYSTEM #3 |
|---|---|---|---|
| XXX#1 | 4.2 | | |
| XXX#2 | 4.2 | 4.2 | 4.2 |
| ZZZ#1 | | 2.9 | |
| ZZZ#2 | 2.5 | | 2.9 |
| ZZZ#3 | | | |
| YYY#1 | | 1.25 | |
| YYY#2 | | 0.1 | 1.25 |
| XXX#3 | | | 0.1 |
| TOTAL (A) | 10.9 | 8.45 | 8.45 |

| PROPER NAME | POWER SUPPLY SYSTEM #1 | POWER SUPPLY SYSTEM #2 | POWER SUPPLY SYSTEM #3 |
|---|---|---|---|
| XXX#1 | 4.2 | | |
| XXX#2 | | | |
| ZZZ#1 | | | |
| ZZZ#2 | | | |
| ZZZ#3 | | | |
| YYY#1 | | | |
| YYY#2 | | | |
| XXX#3 | | | |
| TOTAL (A) | 4.2 | | |

| PROPER NAME | POWER SUPPLY SYSTEM #1 | POWER SUPPLY SYSTEM #2 | POWER SUPPLY SYSTEM #3 |
|---|---|---|---|
| XXX#1 | 4.2 | 4.2 | |
| XXX#2 | | | |
| ZZZ#1 | | | |
| ZZZ#2 | | | |
| ZZZ#3 | | | |
| YYY#1 | | | |
| YYY#2 | | | |
| XXX#3 | | | |
| TOTAL (A) | 4.2 | 4.2 | |

FIG.12A

| PROPER NAME | POWER SUPPLY SYSTEM #1 | POWER SUPPLY SYSTEM #2 | POWER SUPPLY SYSTEM #3 |
|---|---|---|---|
| XXX#1 | 4.2 | | |
| XXX#2 | | 4.2 | |
| ZZZ#1 | | | |
| ZZZ#2 | | | |
| ZZZ#3 | | | |
| YYY#1 | | | |
| YYY#2 | | | |
| XXX#3 | | | |
| TOTAL (A) | 4.2 | 4.2 | 4.2 |

| PROPER NAME | POWER SUPPLY SYSTEM #1 | POWER SUPPLY SYSTEM #2 | POWER SUPPLY SYSTEM #3 |
|---|---|---|---|
| XXX#1 | 4.2 | 4.2 | |
| XXX#2 | 4.2 | | 4.2 |
| ZZZ#1 | | | |
| ZZZ#2 | | | |
| ZZZ#3 | | | |
| YYY#1 | | | |
| YYY#2 | | | |
| XXX#3 | | | |
| TOTAL (A) | 8.4 | 4.2 | 4.2 |

117

POWER SUPPLY DESIGN

CROSS-REFERENCE TO RELATED APPLICATIONS

This application is based upon and claims the benefit of priority of the prior Japanese Patent Application No. 2009-14923, filed on Jan. 27, 2009, the entire contents of which are incorporated herein by reference.

FIELD

The embodiments discussed herein are related to a power supply design.

BACKGROUND

For example, when designing a power supply for a computer network (hereunder, referred to as "network"), a plurality of power supplies that have substantially the same function are provided to prepare for a case in which supply of power is cut off due to a power supply failure or the like. Thus, the power supply configuration in a network is multiplexed. In this kind of network, even when a failure has occurred at one power supply, another power supply that has been multiplexed continues to operate instead of the one power supply. Consequently, the network can continue to operate.

In this connection, for network management systems, there has been proposed a database that stores information corresponding to electronic computers and network devices, and that can generate a network specification drawing that satisfies conditions required by the user based on the information.

Further, for wiring management apparatuses, there has been proposed devices that can perform wiring connection recognition and wiring management on a display of layout drawings of management target objects.

Furthermore, for a monitoring method of a network system as well as the network system, there have been proposed way(s) in which a central apparatus provided in the network system acquires state information of a plurality of relay amplifiers and related information of the plurality of relay amplifiers, and can display state information of a relay amplifier on a transmission line drawing and a transmission line system drawing.

Further, for automatic layout apparatuses and semiconductor integrated circuit design methods, it has been proposed that, by using a limitation information file in which physical limitation conditions are described, layout placement and wiring in accordance with limitation information conditions can be achieved.

Japanese Laid-open Patent Publication No. 5-225104
Japanese Laid-open Patent Publication No. 2003-167932
Japanese Laid-open Patent Publication No. 2004-215027
Japanese Laid-open Patent Publication No. 2000-322462

SUMMARY

According to an embodiment, a method for a computer aiding a design of a power supply that includes extracting data of one of a plurality of power supplies of an apparatus from a product data about the apparatus, extracting data of a power supply system from a power supply system data, the power supply system is not allocated to any of the plurality of power supplies of the apparatus and associating the extracted data of the power supply with the extracted data of the power supply system in a power supply allocation result data.

It is to be understood that both the foregoing summary description and the following detailed description are exemplary and explanatory and are not restrictive of the invention, as claimed.

BRIEF DESCRIPTION OF DRAWINGS

FIGS. 5A-D illustrate examples of design data;

FIG. 6 illustrates an example of component apparatus data;

FIG. 7 illustrates an example of sorting process data;

FIG. 8 illustrates an example of power supply allocation result data;

FIGS. 11A-B illustrate power supply allocation result data; and

FIGS. 12A-B illustrate power supply allocation result data.

DESCRIPTION OF EMBODIMENTS

Designing a power supply is simple in the case of multiplexing power supplies on the basis of electric power consumption at a time of normal operation of various apparatuses that configure a network. However, when designing a power supply of a network it is desirous to take into consideration the electric power that is supplied from a power supply, the electric power consumption of the apparatuses that configure the network and are connected to a power supply, and the operating method of apparatuses that configure the network.

In computers and monitors and the like that are apparatuses that configure a network (hereunder, referred to as "component apparatuses"), there is a significant difference between electric power consumption at a time of normal operation and a standby power when the apparatus is on standby. In other words, the power consumption differs greatly depending on the operating method of the network or component apparatus. Further, for example, in a blade server or the like, the power consumption differs according to the number of blades that are mounted. In other words, even when component apparatuses are substantially the same type, the power consumption of the component apparatuses differs according to the specifications. Further, component apparatuses for which a power supply has been multiplexed and component apparatuses for which a power supply has not been multiplexed are mixed in a network. Accordingly, it is also desirous to take into consideration the operating method of the network, and not just the power supplied from a power supply and the power consumption of apparatuses connected to the power supply.

However, when designing the power supply of this kind of network, in a case where a designer designs the power supply manually, there is the possibility that a design mistake will occur. There are also cases in which, after design of the power supply of a network has been completed, it is desirable to review the power supply design due to design changes such as an increase in the number of component apparatuses. In this case also, since the designer redesigns the power supply manually, the design work is complex and a design mistakes are liable to occur.

Figure 1:
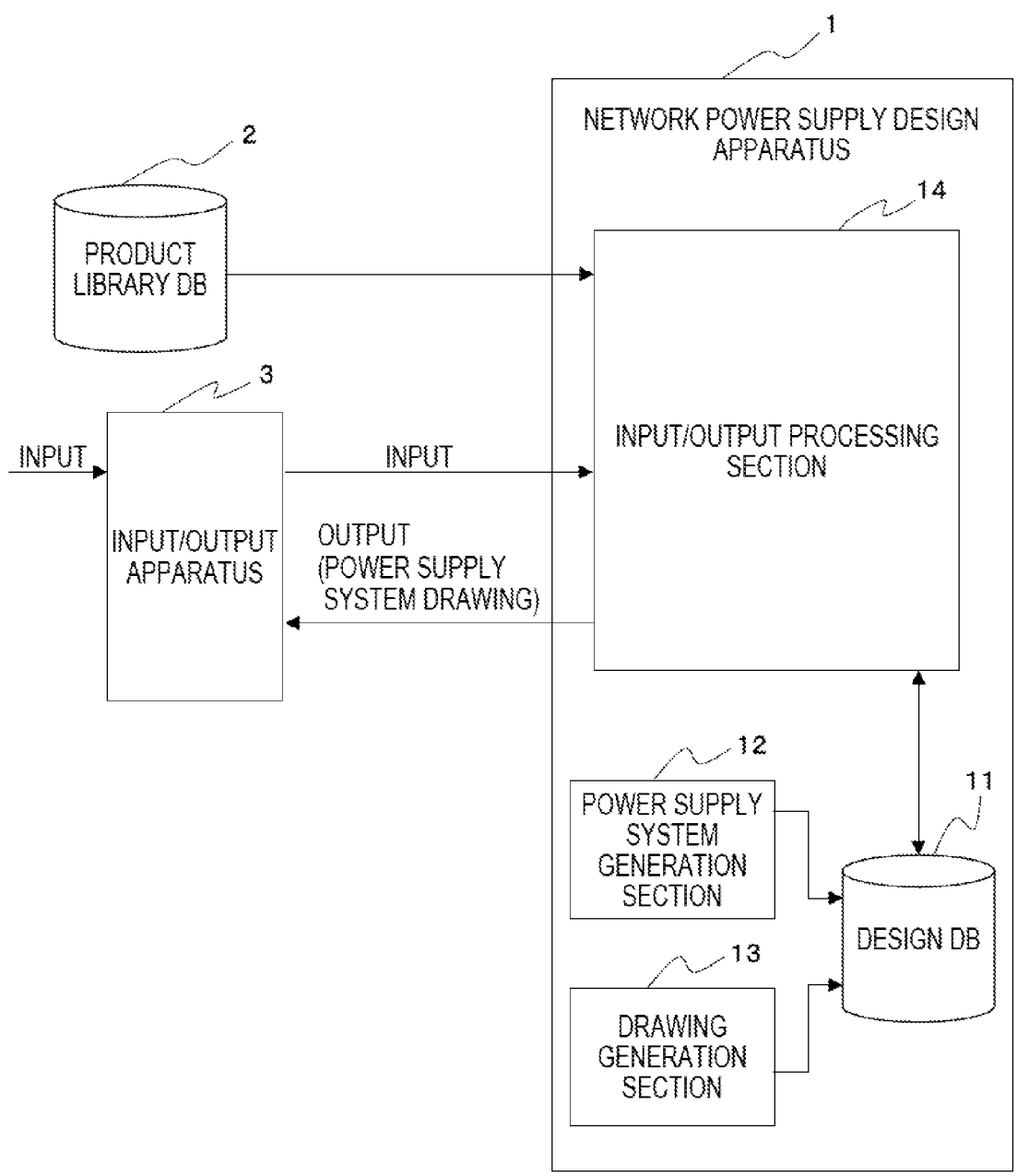
FIG. 1 illustrates an example of the configuration of a network power supply design system.

FIG. 1 illustrates an example of the configuration of a network power supply design system.

The network power supply design system includes a network power supply design apparatus 1, a product library DB (database) 2, and an input/output apparatus 3. The network power supply design apparatus 1 includes a design DB (database) 11, a power supply system generation section 12, a drawing generation section 13, and an input/output processing section 14.

The network power supply design apparatus 1, for example, displays and outputs a power supply system drawing based on an input from the input/output apparatus 3 and product data from the product library DB 2. The power supply system drawing is a drawing that shows the allocation of power supply systems to component apparatuses configuring a network that is the design target or object. The network that is the design target or object is a computer network that includes a plurality of component apparatuses. Examples of the component apparatuses include a computer such as a server machine or a client machine, a display device such as a monitor, a communication relay device such as a router, and an external storage apparatus such as a magnetic disk apparatus. A power supply system includes one or a plurality of power supply apparatuses, and supplies electric power to component apparatuses.

The network power supply design apparatus 1 reads out product data and power supply system data from the product library DB 2 based on an input from the input/output apparatus 3. The product library DB 2 stores various data regarding component apparatuses and various data regarding power supply systems.

The network power supply design apparatus 1 performs allocation processing to allocate power supply systems to component apparatuses that configure the network that is the design object, based on an input from the input/output apparatus 3 and data read from the product library DB 2. The network power supply design apparatus 1 also generates a power supply system drawing based on results of the allocation processing.

The input/output processing section 14 generates an input screen at the time of an input from the input/output apparatus 3, and displays the input screen on the input/output apparatus 3. The input/output processing section 14 reads out product data and power supply system data from the product library DB 2 based on data that is input from the input screen. The input/output processing section 14 also generates design data based on data that is input from the input screen and data that is read out from the product library DB 2, and stores the design data in the design DB 11. The design data includes management data 111, product data 112, operations data 113, and power supply system data 114 that are described later. Further, component apparatus data 115 that is generated based on the aforementioned kinds of data may also be considered to be design data. The design DB 11 is a database that includes design data relating to the design of a power supply system that supplies power to component apparatuses.

Power supply systems that supply power to component apparatuses are allocated to the component apparatuses by the power supply system generation section 12 based on design data and the power supply system data 114. For this purpose, the power supply system generation section 12 generates intermediate data for allocating the power supply systems that supply power to component apparatuses, and stores the generated intermediate data in the design DB 11. The intermediate data includes sorting process data 116 and power supply allocation result data 117 that are described later.

Each kind of data 111 to 117 described above may also be configured as a table that stores each data. These tables can be provided, for example, in a RAM 53 as the main memory.

The drawing generation section 13 generates drawing data 118 that shows power supply systems that supply power to component apparatuses based on intermediate data that has been stored in the design DB 11, and stores the generated drawing data 118 in the design DB 11. The drawing data 118 is described in detail later.

The input/output processing section 14 generates a power supply system drawing, namely, an output screen, of the network that is the design object based on drawing data stored in the design DB 11, and outputs the generated power supply system drawing to the input/output apparatus 3. When the power supply system drawing is input from the input/output processing section 14, the input/output apparatus 3 displays the inputted power supply system drawing on a monitor 58.

Figure 2:
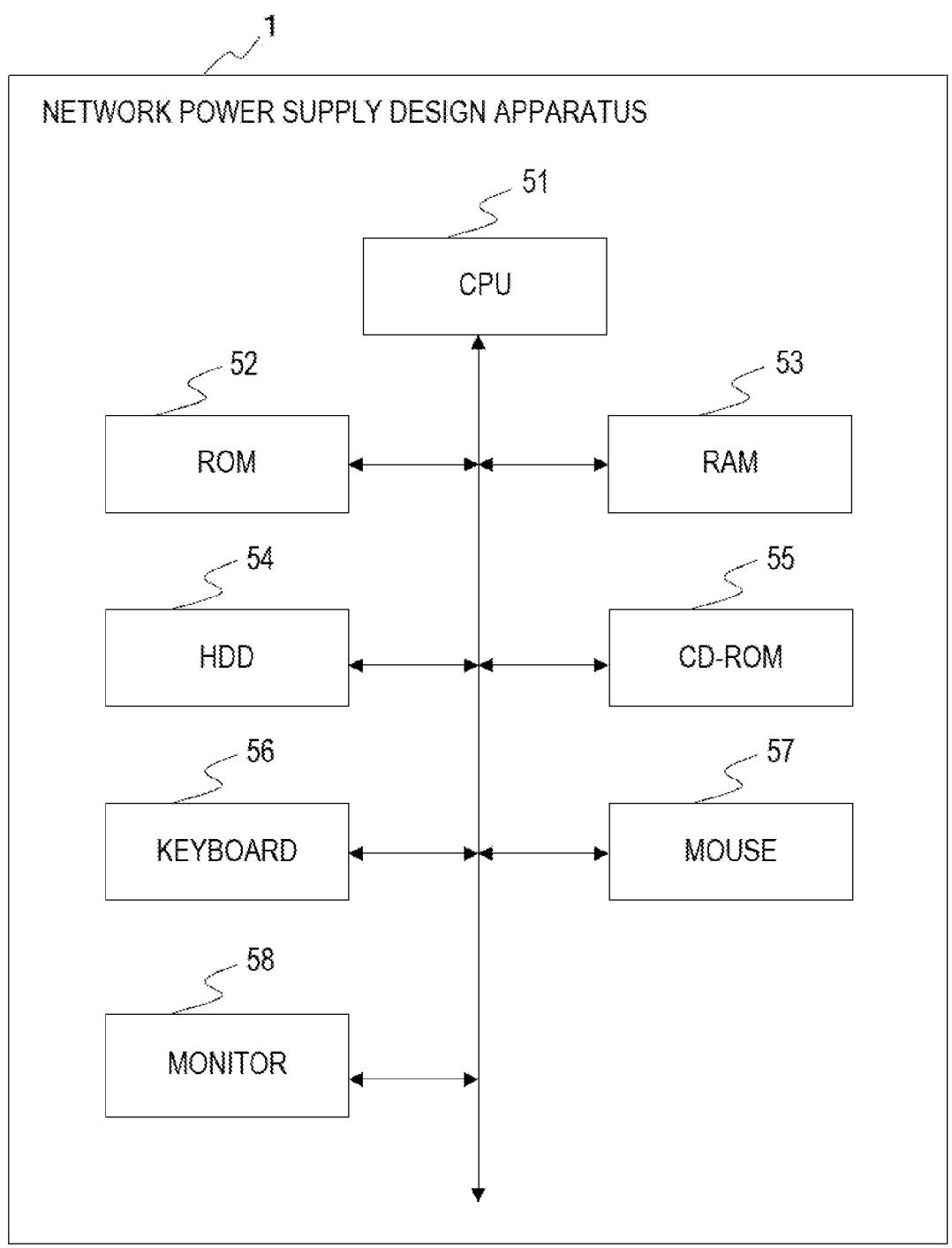
FIG. 2 illustrates an example of the hardware configuration of the network power supply design apparatus.

FIG. 2 illustrates an example of the hardware configuration of the network power supply design apparatus 1 illustrated in FIG. 1.

The network power supply design apparatus 1 includes a CPU (Central Processing Unit) 51, a ROM (Read Only Memory) 52, a RAM (Random Access Memory) 53, a HDD (Hard Disk Drive) 54, a CD-ROM 55, a keyboard 56, a mouse 57, and a monitor 58.

The CPU 51 reads an application program (network power supply design program) that realizes the network power supply design apparatus 1 from the CD-ROM 55, and stores the thus read application program in the HDD 54. The CD-ROM 55 is a drive apparatus for reading data such as an application program that is recorded on a CD-ROM medium. Accordingly, the network power supply design program is stored on a CD-ROM medium and read by a computer. The CD-ROM 55 may also be a drive apparatus for reading other recording media such as a DVD (Digital Versatile Disk) or a FD (Flexible Disk). A configuration may also be adopted so as to store the network power supply design program on the ROM 52.

The CPU 51 transfers the network power supply design program that is stored on the HDD 54 to the RAM 53 that is the main memory, to execute the network power supply design program on the main memory. Thus, various kinds of processing of the power supply system generation section 12, the drawing generation section 13, and the input/output processing section 14 are executed, to thereby realize the network power supply design apparatus 1.

Figure 3:
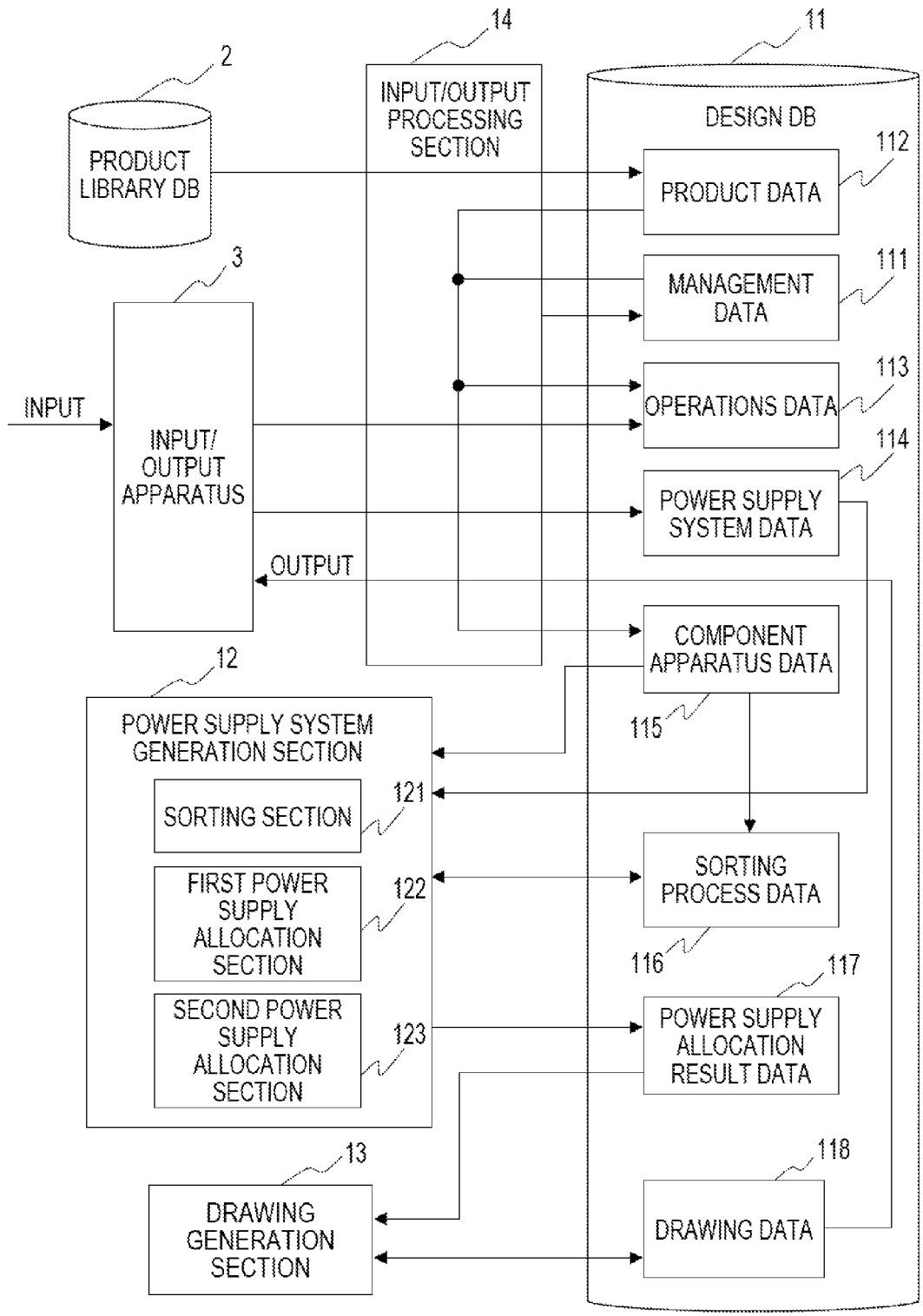
FIG. 3 illustrates an example of the configuration of the network power supply design apparatus.

The HDD 54 is a hard disk device. For example, the HDD 54 includes the design DB 11 illustrated in FIG. 1, and also stores other data. The CPU 51 is a computer that is capable of accessing the design DB 11 that includes various data storage devices or mechanisms that store various data as illustrated in FIG. 3. The HDD 54 may also be configured to include the product library DB 2.

The keyboard 56, mouse 57, and monitor 58 configure the input/output apparatus 3. A designer inputs data using the keyboard 56 and the mouse 57. The monitor 58 displays an input screen to the designer, and displays a power supply system drawing that has been output from the input/output processing section 14. A configuration may also be adopted in which data is input/output via a LAN (Local Area Network) or the like that is connected to the network power supply design apparatus 1, instead of the input/output apparatus 3.

It is also possible to record the relevant program on a CD-ROM medium, and for the network power supply design apparatus 1 to store the relevant program from the CD-ROM medium onto the RAM 53 or the HDD 54 or the like of a computer-readable medium. More specifically, a computer (CPU 51 or the like) may operate as the network power supply design apparatus 1 by way of the application program that is installed on the CD-ROM medium.

Figure 4:
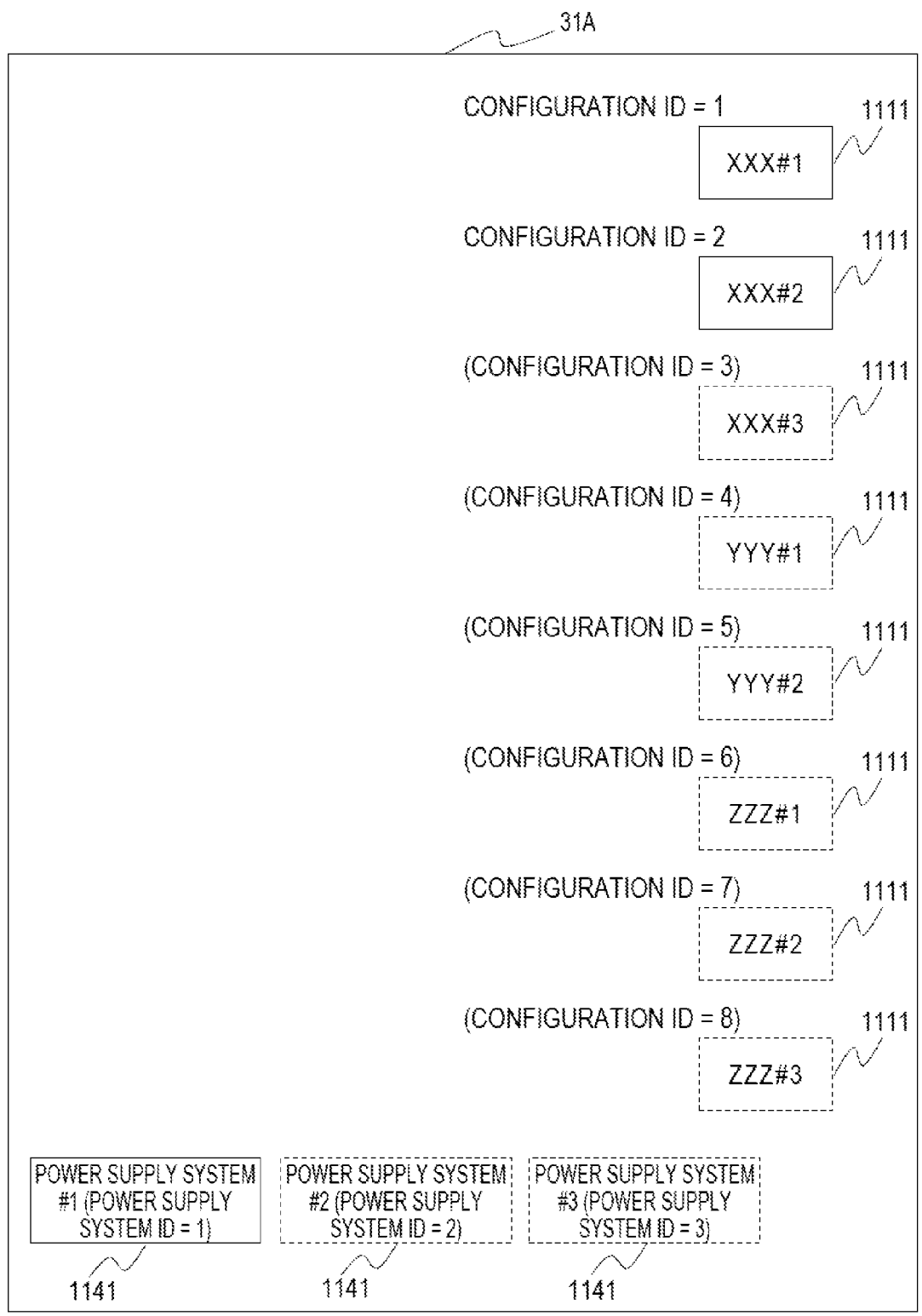
FIG. 4 illustrates an example of an input screen.
Figure 9:
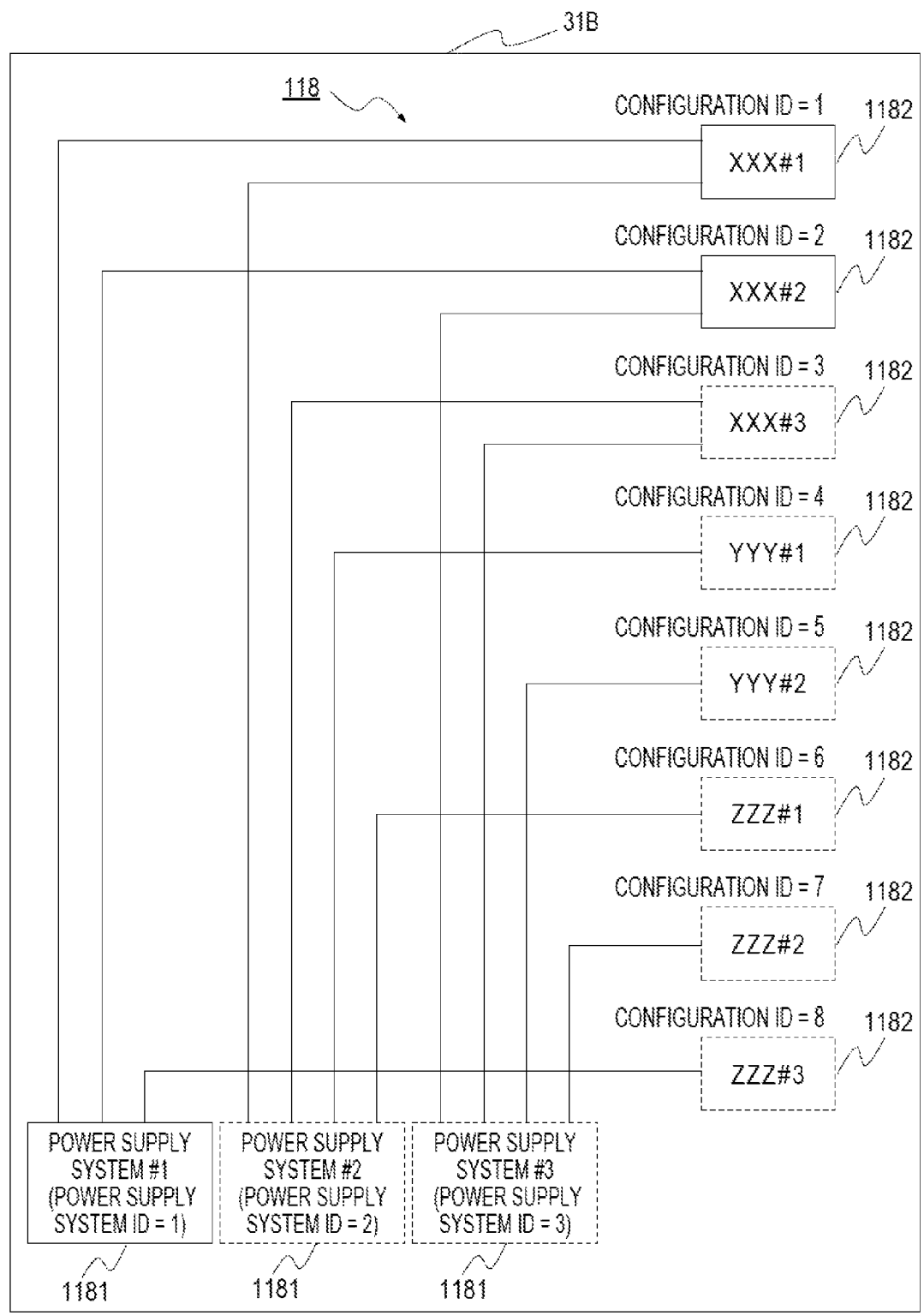
FIG. 9 illustrates an example of an output screen.

FIG. 3 illustrates an example of the configuration of the network power supply design apparatus 1. FIG. 4 illustrates an example of an input screen. FIGS. 5 to 8 are explanatory views of the design data illustrated in FIG. 3. FIG. 9 illustrates an example of an output screen. Hereunder, processing that is executed by the network power supply design apparatus 1 according to FIG. 3 is described while referring to FIG. 4 to FIG. 9.

The input/output processing section 14 generates design data based on an input from the input/output apparatus 3. The input/output processing section 14 stores the generated design data in the design DB 11. The design data includes the management data 111, the product data 112, the operations data 113, and the power supply system data 114. The design data is described later referring to FIG. 5A to FIG. 5D.

The input/output processing section 14 displays an input screen 31A for inputting a configuration of the network on the monitor 58. FIG. 4 is an example of the input screen 31A for inputting the configuration of the network.

As illustrated in FIG. 4, the input screen 31A has a predetermined format. In other words, the input screen 31A includes a plurality of vertical input fields 1111, and a plurality of horizontal fields 1141. The vertical input fields 1111 are input fields for component apparatuses, and in practice the proper names of component apparatuses are input therein. The horizontal fields 1141 are input fields for power supply systems, and in practice power supply system names of power supply systems are input therein. The input/output processing section 14 inputs data for configuring the network based on data including input data of the vertical input fields 1111 and input data of the horizontal input fields 1141 from the input/output apparatus 3.

FIG. 4 illustrates a state in which, as indicated by the solid lines, proper names of two component apparatuses are input into the vertical input fields 1111 and a power supply system name of one power supply system is input into the horizontal fields 1141. Input will be performed for the portions illustrated by dashed lines in FIG. 4 hereafter.

In accordance with the input data that is decided for the input fields 1111, the input/output apparatus 3 takes a proper name for each component apparatus ID as input data, and outputs the relevant data to the input/output processing section 14. Further, in accordance with the input data that is decided for the input fields 1141, the input/output apparatus 3 takes a power supply system name for each power supply system ID as input data, and outputs the relevant data to the input/output processing section 14.

The product data 112 from the product library DB 2 and data from the input/output apparatus 3 are input to the input/output processing section 14. The input/output processing section 14 generates design data based on the inputted data. The input/output processing section 14 stores the generated design data in the design DB 11. Hereunder, processing to generate design data is described.

The input/output processing section 14 generates management data 111 based on data from the input/output apparatus 3, and stores the management data 111 in the design DB 11. FIG. 5A illustrates an example of the management data 111.

As illustrated in FIG. 5A, the management data 111 includes a configuration ID (identify) of the component apparatus, and a proper name. The configuration ID is an ID for identifying a component apparatus that is input for the network that is the design target. The configuration ID is uniquely decided for each component apparatus on the network. The configuration ID is assigned by the input/output processing section 14 at a time of inputting a proper name of a component apparatus. The proper name is a specific name of a component apparatus, and is uniquely determined for each component apparatus. For example, the proper name is a product name or a model number.

The designer inputs a proper name to be used for component apparatuses, and selects component apparatuses. At this time, for the purpose of multiplexing, the same component apparatuses are selected. For example, when selecting three component apparatuses with the proper name XXX, the designer adds the numbers #1 to #3 to the proper name XXX to distinguish the three component apparatuses from each other.

In the example in FIG. 4, when data for a proper name XXX#1 is input to the first vertical input field 1111 from the input/output apparatus 3, if the input is the first input the input/output processing section 14 adds a configuration ID=1 to a component apparatus that corresponds to the proper name XXX#1.

Next, when data for a proper name XXX#2 is input to the second vertical input field 1111, the input/output processing section 14 increments the value of the previously assigned configuration ID by +1, and thus assigns a configuration ID=2 to a component apparatus that corresponds to the proper name XXX#2.

Thereafter, for example, as illustrated in FIG. 4, proper name XXX#3 to proper name ZZZ#3 are input to the input field 1111 with the input/output processing section 14. In response thereto, the input/output processing section 14 similarly assigns configuration IDs=3 to 8 to the corresponding component apparatuses. Thus, the management data 111 is generated for each configuration ID.

The input/output processing section 14 retrieves the product data 112 from the product library DB 2 based on an input from the input/output apparatus 3, and inputs the product data 112. The input/output processing section 14 stores the inputted product data 112 in the design DB 11. FIG. 5B illustrates an example of the product data 112.

As illustrated in FIG. 5B, for each configuration ID, the product data 112 includes a power supply classification (V: voltage unit), an electric power consumption (W: electric power unit), a standby power (W), and a number of power supplies. The power supply classification (V) is the kind of power supply voltage to be used by the product, and for example is a rated voltage value such as 200 (V). The electric power consumption (W) indicates a value of electric power consumption when the product is in an operating state. The standby power (W) indicates a value of electric power consumption when the product is in a standby state. The number of power supplies indicates a number of power supply inputs that receive a power supply of the product.

For example, the input/output processing section 14 searches the product library DB 2 using a proper name excluding a number portion (for example, #1) of a component apparatus that is input as illustrated in FIG. 4, and reads out data of products that have the proper name in question. Next, the input/output processing section 14 generates the product data 112 using the relevant component apparatus proper name, configuration IDs corresponding thereto, and the product data that has been read out. Accordingly, for each component apparatus proper name, the product library DB 2 stores the power supply classification (V: voltage unit), the electric power consumption (W: electric power unit), the standby power (W), and the number of power supplies.

The input/output processing section 14 generates operations data 113 for each configuration ID based on data that is input from the input/output apparatus 3. The input/output processing section 14 stores the generated operations data 113 in the design DB 11. FIG. 5C illustrates an example of the operations data 113.

As illustrated in FIG. 5C, the operations data 113 includes an operating method and an alternative device for each component apparatus. The operating method may be normal operation, hot standby, or cold standby. The alternative device shows, for each component apparatus, the proper name of another component apparatus that has been multiplexed.

For example, in FIG. 4, when designating the proper name XXX#1, "XXX" is taken as the product name, and "#1" is taken as the operating method. Accordingly, the operating method is decided by the designer. For example, "normal", "hot", "cold" or the like is input as "#1". A configuration may also be adopted in which "normal", "hot", "cold" or the like is input using numbers or symbols other than "#1". Another component apparatus that has the same product name XXX as one component apparatus but has a different operating method thereto is a multiplexed other component apparatus, and is the alternative device of the one component apparatus. Accordingly, once the operating method is decided, the alternative device is decided based thereon.

"Normal operation" refers to an operating method in an operating state when a component apparatus is operating normally. "Hot standby" refers to an operating method on a standby system side in operations for multiplexed component apparatuses. In the hot standby operating method, one component apparatus (main system) is made to perform normal operation and another component apparatus (standby system) is made to standby while performing substantially the same operation. The component apparatus that is on hot standby is to maintains the same state as the main system, and if a fault occurs at the main system the component apparatus that is on hot standby immediately takes over the processing of the main system. "Cold standby" refers to an operating method on a standby system side in operations for multiplexed component apparatuses. In the cold standby operating method, the main system is operated normally, and the standby system is not operated. If a fault occurs at the main system, the component apparatus that is on cold standby starts up and performs the processing of the main system.

For example, when triplexing component apparatuses with the same proper name XXX, three component apparatuses are used, and the proper names XXX#1 to #3 are assigned. Further, for example, it is assumed that the component apparatus with the proper name XXX#1 is made to perform normal operation, the component apparatus with the proper name XXX#2 is placed on hot standby, and the component apparatus with the proper name XXX#3 is placed on cold standby. In this case, the alternative devices of the component apparatus with the proper name XXX#1 are the component apparatuses with the proper names XXX#2 and #3.

The input/output processing section 14 generates the power supply system data 114 based on data that is input by the input/output apparatus 3. The input/output processing section 14 stores the generated power supply system data 114 in the design DB 11. FIG. 5D illustrates an example of the power supply system data 114.

As illustrated in FIG. 5D, the power supply system data 114 includes a power supply system ID, a power supply system name, a power supply classification (V), and contracted amperage (A: current units). The power supply system ID is an ID for identifying an inputted power supply system. The power supply system ID is uniquely decided for each power supply system by the input/output processing section 14. The power supply system name is a name of a power supply system, and is defined for each power supply system. The power supply classification (V) is a rated voltage value of the power supply system, and is defined for each power supply system. The contracted amperage (A) indicates the rated current value (A) of the power supply system, and is defined for each power supply system. The contracted amperage (A) may also be a current value limited to each power supply system that is predetermined by the designer.

In the following explanation, it is assumed that the power supply system data 114 is stored for three power supply systems for which the power supply system names are power supply system #1 to #3. Further, it is assumed that the power supply classification (V) is 200 and the contracted amperage (A) is 30 for each of the power supply systems #1 to #3.

An example of processing that assigns a power supply system ID to a power supply system name that is input from the input/output apparatus 3 is illustrated in FIG. 4. In FIG. 4, when data of the proper name XXX#1 is input to the vertical input field 1111 from the input/output apparatus 3 and, for example, that input is the first input, the input/output processing section 14 assigns a configuration ID=1 that is previously defined as an initial value to the component apparatus corresponding to the proper name XXX#1.

Next, when data of the proper name XXX#2 is input to a different vertical input field 1111 from the input/output apparatus 3, the input/output processing section 14 increments that value of the configuration ID that was previously assigned by +1, and assigns a configuration ID=2 to the component apparatus corresponding to the proper name XXX#2. Thereafter, as illustrated in FIG. 4, when data of the proper name XXX#3 to proper name ZZZ#3 is input to the input fields 1111, the input/output processing section 14 assigns configuration IDs=3 to 8 to the corresponding component apparatuses in a similar manner.

In FIG. 4, when power supply system #1 is input as a power supply system name into a horizontal input field 1141 from the input/output apparatus 3, and that input is the first input of a power supply system, the input/output processing section 14 assigns a power supply system ID=1. Next, when power supply system #2 is input as a power supply system name into a different horizontal input field 1141 from the input/output apparatus 3, the input/output processing section 14 increments the previously assigned power supply system ID number by +1, and assigns a power supply system ID=2. Thereafter, the input/output processing section 14 assigns a power supply system ID=3 to the power supply system #3 in a similar manner.

The input/output processing section 14 stores the power supply system name together with the power supply classification (V) and contracted amperage (A) that are included in an input from the input/output apparatus 3 in the design DB 11 as the power supply system data 114, described later, for each power supply system ID.

For example, the input/output processing section 14 searches the product library DB 2 using a proper name excluding a number portion (for example, #1) of a power supply system that is input in FIG. 4, and reads data of power supply systems that have the relevant proper name. The input/output processing section 14 then generates the power supply system data 114 using the proper name of the relevant power supply system, a power supply system ID corresponding thereto, and data of the power supply system that has been read. Accordingly, the product library DB 2 stores the power supply classification (V) and the contracted amperage (A) for each proper name of a power supply system.

The input/output processing section 14 generates component apparatus data 115 that is associated with each configuration ID based on the management data 111, the product data 112, and the operations data 113. The input/output processing section 14 stores the generated component apparatus data 115 in the design DB 11. FIG. 6 illustrates an example of the component apparatus data 115.

As illustrated in FIG. 6, the component apparatus data 115 includes the proper name, the power supply classification (V), the electric power consumption (W), the standby power (W), the number of power supplies, a current (A), the operating method, and the alternative device(s) for each configuration ID. The configuration ID and the proper name are obtained from the management data 111. The power supply classification (V), electric power consumption (W), standby power (W), and number of power supplies are obtained from the product data 112 by employing the configuration ID as a key. The operating method and alternative device(s) are obtained from the operations data 113 by employing the configuration ID as a key.

The input/output processing section 14 calculates the current (A) by the following formula: current (A)=electric power consumption (W) of apparatus÷power supply classification (V)÷power factor. Although the power factor is previously defined as 0.6 in the example illustrated in FIG. 6, a value other than 0.6 may also be used as the power factor value. Further, a configuration may be adopted so as to input the power factor as one portion of data from the input/output apparatus 3. The input/output processing section 14 takes the calculated value as the current (A) of the component apparatus data 115.

Power supply systems that supply power to component apparatuses are allocated to component apparatuses by the power supply system generation section 12 based on the component apparatus data 115 and the power supply system data 114. For this purpose, the power supply system generation section 12 reads out the component apparatus data 115 and the power supply system data 114 relating to a component apparatus that is a design object based on the design DB 11. The power supply system generation section 12 generates the sorting process data 116 and the power supply allocation result data 117 for allocating a power supply system that supplies power to the component apparatus based on the component apparatus data 115 and the power supply system data 114 that are read out, and stores the thus generated data in the design DB 11. The power supply system generation section 12 includes a sorting section 121, a first power supply allocation section 122, and a second power supply allocation section 123.

The input/output processing section 14 selects a component apparatus as a processing target, and extracts candidates for a power supply system that should supply power to the selected component apparatus from among the power supply systems input in FIG. 4, that is, the power supply system data 114. A power supply system that is taken as a candidate is a power supply system with a power supply classification that is substantially the same as a predetermined power supply classification. The predetermined power supply classification is a power supply classification of a power supply system that should supply power to the component apparatus.

The input/output processing section 14 selects a power supply system that should supply power to the component apparatus from among the power supply system candidates that are extracted, and allocates the selected power supply system to the component apparatus in question. The power supply system that is selected is a power supply system for which a total of currents flowing to other component apparatuses that are decided in accordance with operating methods of the component apparatuses is smallest among the power supply system candidates. In this case, the aforementioned currents are currents flowing to other component apparatuses to which the power supply system in question has been previously allocated.

For this purpose, the input/output processing section 14 determines the current (A) for each configuration ID in the component apparatus data 115 in the manner described hereafter based on the electric power consumption (W) or the standby power (W), and the operating method. The input/output processing section 14 refers to the operating method of the apparatus that is the object for which the current (A) is to be calculated, and when the operating method is normal operation or hot standby the input/output processing section 14 takes the electric power consumption (W) of the component apparatus data 115 as the electric power consumption of the component apparatus. In contrast, when the operating method is cold standby, the input/output processing section 14 takes the standby power (W) of the component apparatus data 115 as the electric power consumption of the component apparatus.

The sorting section 121 generates the sorting process data 116 based on the component apparatus data 115 stored in the design DB 11. The sorting section 121 stores the generated sorting process data 116 in the design DB 11. FIG. 7 illustrates an example of the sorting process data 116.

As illustrated in FIG. 7, for each proper name, the sorting process data 116 includes an apparatus electric power consumption (W), the electric power consumption (W), the standby power (W), the operating method, and a processed number of power supplies.

The sorting section 121 determines the apparatus electric power consumption corresponding to an operating method based on the component apparatus data 115 that is referred to. Together with that information, the sorting section 121 generates a processed number of power supplies that is a flag that confirms a result of allocation of a power supply system that supplies power to a component apparatus for each proper name.

The sorting section 121 sorts (arranges) component apparatuses based on the component apparatus electric power consumption (W) obtained from the component apparatus data 115. More specifically, the sorting section 121 sorts component apparatuses in the order of highest value with respect to the apparatus electric power consumption (W). In this connection, when component apparatuses share substantially the same electric power consumption value, the sorting section 121 gives priority with respect to the order in sorting to processing that allocates a power supply system that supplies power to a component apparatus for which the operating method is normal operation.

Further, when the component apparatuses also share substantially the same operating method, such as normal operation, the sorting section 121 selects the component apparatus that has the smaller value with respect to the configuration ID with a higher priority based on the component apparatus data 115. The sorting section 121 stores the generated sorting process data 116 in the design DB 11.

The power supply system generation section 12 generates the power supply allocation result data 117 based on the component apparatus data 115 and the sorting process data 116. In other words, allocation processing that allocates a power supply system to a component apparatus is processing that creates or updates the power supply allocation result data 117. The power supply system generation section 12 stores the generated power supply allocation result data 117 in the design DB 11. FIG. 8 illustrates an example of the power supply allocation result data 117.

As illustrated in FIG. 8, the power supply allocation result data 117 is data that includes proper names of component apparatuses, allocation of power supply systems to component apparatuses, and a total current (A) of power supply systems. The proper names of component apparatuses are information that shows component apparatuses that are objects for allocation of power supply systems. The allocation of power supply systems to component apparatuses is information that shows the allocated amounts of current consumption (A) for the power supply system names that have been allocated to the component apparatuses. The total current (A) of the power supply systems is information that shows the total of the current consumption (A) of component apparatuses that is allocated for the power supply systems.

In other words, as illustrated in FIG. 8, the power supply allocation result data 117 is two-dimensional data corresponding to component apparatuses that are the vertical fields 1182 on the input screen 31A and power supply systems that are the horizontal fields 1181 on the input screen 31A. The power supply allocation result data 117 is data that describes, at a point of intersection between a component apparatus and a power supply system, a current consumption (A) of a power supply allocated to a component apparatus with respect to the relevant power supply system. As a result, it is shown that the relevant current consumption (A) is allocated to the relevant component apparatus from the relevant power supply system.

As described later, FIG. 11 and FIG. 12 illustrate power supply allocation result data 117 that is in the course of being processed, i.e. data during processing, based on which the power supply allocation result data 117 illustrated in FIG. 8 is ultimately obtained. In other words, the power supply allocation result data 117 is created and updated in the order of, for example, FIG. 11A, FIG. 11B, FIG. 12A, FIG. 12B, and FIG. 8, by allocation processing that allocates power supply systems to component apparatuses.

The first power supply allocation section 122 determines whether or not a power supply system that supplies power to a component apparatus is allocated based on the component apparatus data 115 and the sorting process data 116. Further, the first power supply allocation section 122 searches for a component apparatus for which the processed number of power supplies has not reached the number of power supplies of the apparatus. Based on the above determination, the first power supply allocation section 122 retrieves a component apparatus to which a power supply has not been allocated, and selects the component apparatus as an object of processing of the second power supply allocation section 123.

Based on the power supply system data 114 and the component apparatus data 115, the second power supply allocation section 123 retrieves power supply systems with the same power supply classification as the power supply classification of the power supply that should supply power to the component apparatus that is the processing object or target. The second power supply allocation section 123 allocates a power supply system from among the retrieved power supply systems to the component apparatus that is the processing object. The second power supply allocation section 123 increments by +1 the processed number of power supplies of the sorting process data 116 for the component apparatus that is the processing object, and updates the processed number of power supplies of the component apparatus that is the processing object to the incremented value in the sorting process data 116.

If the first power supply allocation section 122 or the second power supply allocation section 123 determines that it is not possible to allocate a power supply system to supply power to the component apparatus that is the processing object, the first power supply allocation section 122 or the second power supply allocation section 123 sends an error notification to the input/output apparatus 3 or repeatedly executes the processing up to generation of the power supply allocation result data 117. The power supply system generation section 12 stores the generated power supply allocation result data 117 in the design DB 11.

The input/output processing section 14 checks whether or not the power supply system that is to be allocated to the component apparatus has already been allocated to the component apparatus in question or to an alternative device thereof. In this connection, in practice, prior to allocation of a power supply system, a check is performed to determine whether or not the power supply system that is to be used for allocation is already allocated to the component apparatus in question or to an alternative device thereof.

When a power supply system that is to be allocated to a component apparatus has already been allocated to the component apparatus in question or to an alternative device thereof, the input/output processing section 14 does not allocate the relevant power supply system to the component apparatus. Subsequently, from among the extracted power supply system candidates, the input/output processing section 14 allocates a new power supply system to the relevant component apparatus, excluding power supply systems that have been allocated (or which it was attempted to allocate) to the component apparatus. The power supply system that is newly allocated is a different power supply system which has the smallest total of current flowing to other component apparatuses to which the power supply system in question has already been allocated.

As described above, allocation of power supply systems among the power supply systems #1 to #3 is performed for each of the component apparatuses. As a result, allocation of power supply systems that supply power to the component apparatuses may be performed in a balanced manner. It is also possible to prevent the same power supply system from being allocated more than once to the same component apparatus.

In accordance with the allocation of power supply systems to the component apparatuses as described above, the drawing generation section 13 generates the drawing data 118 that shows the power supply systems that are allocated to component apparatuses. More specifically, the drawing generation section 13 reads the power supply allocation result data 117 from the design DB 11, and generates the drawing data 118 that relates to wiring of the power supply systems in a predetermined data format based on the data that is read. The drawing generation section 13 stores the generated drawing data 118 in the design DB 11. FIG. 9 illustrates an example in which the drawing data 118 is output as a power supply system drawing.

As illustrated in FIG. 9, the drawing data 118 is a power supply system drawing that includes a configuration ID and a corresponding proper name of the component apparatuses, a power supply system ID and a corresponding power supply system name of the power supply systems that supply power, and wiring that connects the component apparatuses and the power supply systems. More specifically, the drawing data 118 is data that illustrates connections, that is, wiring, between component apparatuses with proper names 1182 and power supply system names 1181. In this connection, the drawing data 118 may match or may not match the actual layout of component apparatuses, layout of power supply systems, and wiring in the computer network.

In response to a request form the input/output apparatus 3, the input/output processing section 14 reads the generated drawing data 118 from the design DB 11. The input/output apparatus 3 then displays an output screen 31B on the monitor 58 as output of the power supply system drawing. The output screen 31B is a screen that corresponds to the input screen 31A. On the output screen 31B, the vertical fields 1182 show component apparatuses and the horizontal fields 1181 show power supply systems.

For example, the component apparatuses as the vertical fields 1182 and the power supply systems as the horizontal fields 1181 in the output screen 31B are the same as in the input screen 31A. Since all component apparatuses and power supply systems present on the network are input to the input screen 31A, the component apparatuses and power supply systems are shown by solid lines on the output screen 31B.

For example, in FIG. 9, it is shown that the power supply system #1 and the power supply system #2 are allocated to the component apparatus with the proper name XXX#1. In other words, it is shown that power is supplied from the power supply system #1 and the power supply system #2 to the component apparatus with the proper name XXX#1. A similar situation applies with respect to the other component apparatuses.

More specifically, in FIG. 9, the component apparatus with the proper name XXX#1 is connected by connecting lines drawn with solid lines to the power supply system #1 and the power supply system #2 based on the data illustrated in FIG. 8. On the output screen 31B, for example, positions (a grid) at which a plurality of connecting lines should be drawn are predetermined for each component apparatus and each power supply system.

Figure 10:
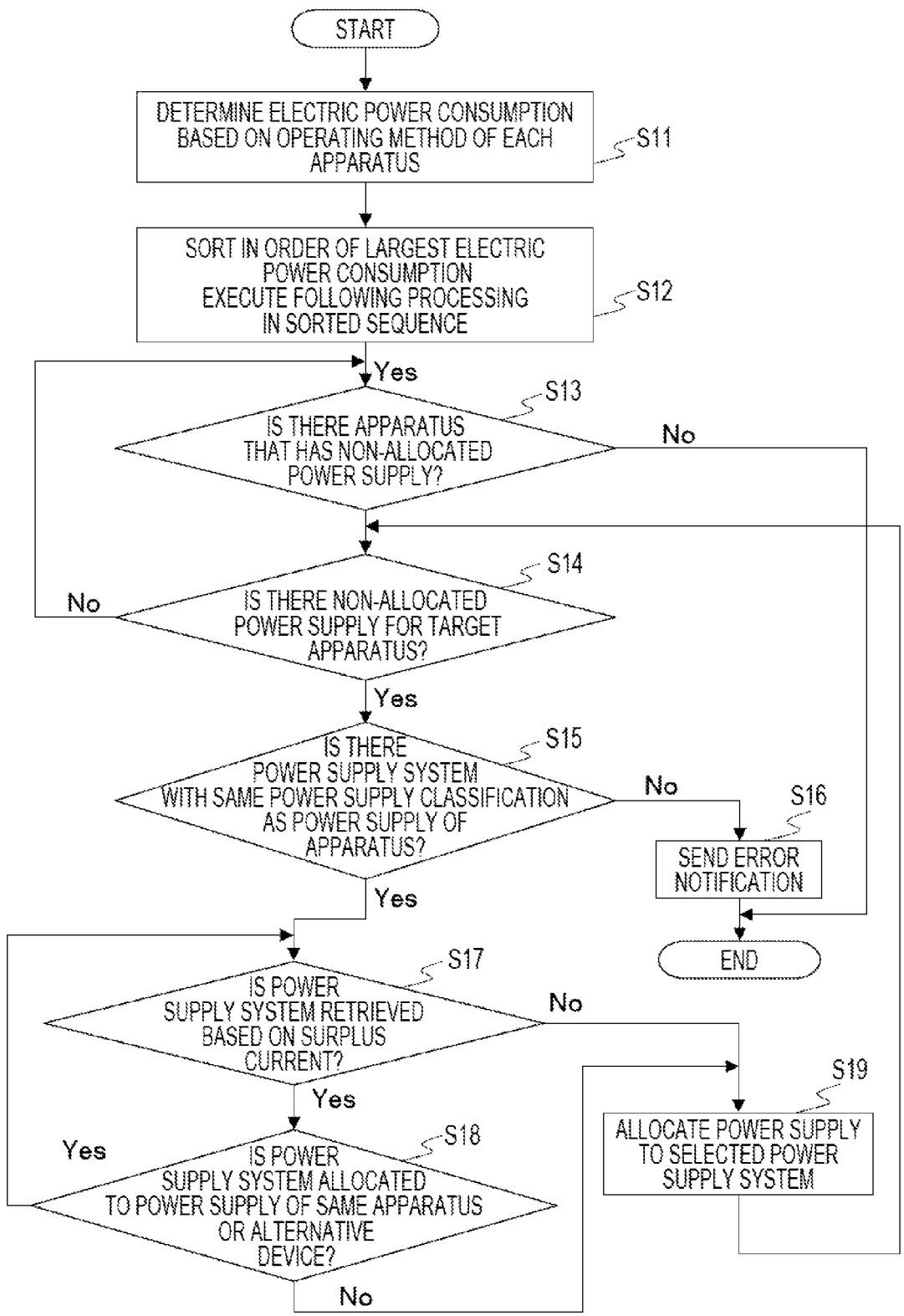
FIG. 10 illustrates a flow of allocation processing for power supply systems.

FIG. 10 illustrates a flow of allocation processing for power supply systems. This allocation processing for power supply systems is executed by the power supply system generation section 12 illustrated in FIG. 3.

The input/output processing section 14 generates the component apparatus data 115 as described hereunder, taking allocation processing for power supply systems of the power supply system generation section 12 as pre-processing.

In accordance with an input by the designer, the input/output apparatus 3 inputs data relating to a component apparatus that is the design object or target. The input/output processing section 14 inputs data from the input/output apparatus 3 and the product data 112 from the product library DB 2. The input/output processing section 14 generates design data based on the aforementioned data that are input, and stores the generated design data in the design DB 11. The input/output processing section 14 generates the component apparatus data 115 based on design data that is stored in the design DB 11. The input/output processing section 14 stores the generated component apparatus data 115 in the design DB 11.

Thereafter, upon the input/output processing section 14 storing the generated component apparatus data 115 in the design DB 11, the power supply system generation section 12 starts allocation processing for power supply systems as described below.

First, based on the component apparatus data 115, the sorting section 121 determines an apparatus electric power consumption that corresponds to the operating method of each component apparatus (at S11). More specifically, when the operating method is normal operation or hot standby, the sorting section 121 takes the electric power consumption (W) in the component apparatus data 115 as the electric power consumption of the relevant component apparatus. Further, when the operating method is cold standby, the sorting section 121 takes the standby power (W) in the component apparatus data 115 as the electric power consumption of the relevant component apparatus. The sorting section 121 generates the sorting process data 116 based on the data for electric power consumption of the component apparatuses that is determined and the component apparatus data 115. The sorting section 121 stores the generated sorting process data 116 in the design DB 11.

Next, the sorting section 121 sorts the sorting process data 116 for each proper name in largest size order with respect to the data for the electric power consumption of the component apparatuses (at S12). The sorting section 121 sorts the sorting process data 116 in the manner shown in the result illustrated in FIG. 7. As illustrated in FIG. 7, the sorting section 121 sorts the component apparatuses in the order of proper names XXX#1, XXX#2, ZZZ#1, ZZZ#2, ZZZ#3, YYY#1, YYY#2, and XXX#3. The sorting section 121 updates the sorting process data 116 of the design DB 11 in order to reflect the sorted results.

The sorting section 121 selects a component apparatus that is a processing object (or target) for allocation of a power supply system according to the order of highest value with respect to the apparatus electric power consumption in the sorting process data 116. In the example illustrated in FIG. 7, the sorting section 121 selects the proper name XXX#1 that is first in the order of priority as the component apparatus that is the processing object for allocation of a power supply system.

Next, based on the sorting process data 116, the first power supply allocation section 122 determines whether or not there is a component apparatus that has a non-allocated power supply (at S13). In other words, the first power supply allocation section 122 determines whether or not there is a component apparatus for which a processed number of power supplies=0 in the sorting process data 116. If there is no component apparatus that has a non-allocated power supply (No at S13), the first power supply allocation section 122 ends the processing.

If there is a component apparatus that has a non-allocated power supply (Yes at S13), the first power supply allocation section 122 further determines whether or not there is a non-allocated power supply with respect to the component apparatus that is the processing object based on the component apparatus data 115 and the sorting process data 116 (at S14). In other words, based on the aforementioned data, the first power supply allocation section 122 determines whether or not the processed number of power supplies is equals to the number of power supplies of the apparatus. If there is not a non-allocated power supply with respect to the component apparatus that is the processing object (No at S14), the first power supply allocation section 122 repeats S13.

If there is a non-allocated power supply with respect to the component apparatus that is the processing object (Yes at S14), based on the power supply system data 114 and the component apparatus data 115, the second power supply allocation section 123 determines whether or not there is a power supply system that has substantially the same power supply classification as the power supply classification of a power supply that should be supplied to the component apparatus that is the processing object (step S15).

If there is no power supply system that has the same power supply classification as the power supply classification of the power supply that should be supplied to the component apparatus that is the processing object (No at S15), the second power supply allocation section 123 issues an error notification (at S16). This corresponds to a case in which there is absolutely no power supply system that has substantially the same power supply classification as the power supply classification of the apparatus.

In this connection, even when there is a power supply system that has substantially the same power supply classification, in a case in which the total (A) in the power supply allocation result data 117 will exceed the contracted amperage (A), i.e. the rated current value, of the power supply system data 114 if the power supply system in question is allocated, the second power supply allocation section 123 determines that there is no power supply system with substantially the same power supply classification.

After the second power supply allocation section 123 issues an error notification to the input/output processing section 14 to the effect that a power supply system cannot be allocated, the power supply system generation section 12 ends the power supply system allocation processing. The input/output processing section 14 outputs the error notification via the input/output apparatus 3.

When there is a power supply system that has substantially the same power supply classification as the power supply classification of the power supply that should be supplied to the component apparatus that is the processing object (Yes at S15), the second power supply allocation section 123 selects power supply systems that have substantially the same power supply classification as candidates for allocation, and searches the power supply systems that are selected as candidates to extract a power supply system that has the largest surplus current (at S17). In other words, the second power supply allocation section 123 selects the power supply system that has the largest surplus current among the power supply systems #1 to #3 that are selected as candidates, based on the power supply allocation result data 117 and the power supply system data 114. The term "surplus current" refers to a value that is obtained by subtracting the value of current for which the relevant power supply system has already been allocated as a power supply, that is, the total (A) of the power supply allocation result data 117 at that time, from the contracted amperage (A) of the relevant power supply system.

In this connection, when a plurality of power supply systems that are selected have substantially the same current total (A), the second power supply allocation section 123 selects a single power supply system according to the ascending order of the power supply system IDs (the power supply system ID=1 is first in the order).

A power supply system may also be selected using surplus electric power instead of surplus current, for example, using largest surplus electric power instead of largest surplus current.

If a power supply system that has the largest surplus current is extracted (Yes at S17), the second power supply allocation section 123 determines whether or not the selected power supply system has already been allocated to the same component apparatus or to an alternative device thereof (at S18). More specifically, based on the component apparatus data 115 and the sorting process data 116, the second power supply allocation section 123 determines that the processed number of power supplies=0 for the component apparatus with the proper name XXX#1 and that the alternative devices thereof are the component apparatuses with the proper names XXX#2 and XXX#3. Further, based on the power supply allocation result data 117, the second power supply allocation section 123 determines that the power supply system #1 is not allocated to the component apparatuses with the proper names XXX#2 and XXX#3 that are alternative devices.

If the selected power supply system has already been allocated to the same component apparatus or to an alternative device thereof (Yes at S18), the second power supply allocation section 123 executes at S17 based on power supply system candidates excluding the aforementioned power supply system that has been selected.

If only one power supply system remains as a power supply system candidate (No at S17), or if the selected power supply system has not been allocated to the same component apparatus or to an alternative device thereof (No at S18), the second power supply allocation section 123 allocates a power supply to the selected power supply system based on the power supply allocation result data 117 (at S19). In other words, the second power supply allocation section 123 allocates the power supply system #1 that is selected at S17 to the single component apparatus with the proper name XXX#1. The second power supply allocation section 123 updates the power supply allocation result data 117 based on the allocation result and the electrical current data of the component apparatus data 115.

FIG. 11 and FIG. 12 illustrate an example of generation of the power supply allocation result data 117. FIG. 11 and FIG. 12 illustrate the power supply allocation result data 117 during the course of obtaining the result that ultimately appears as shown in FIG. 8 and FIG. 9. The result shown in FIG. 8 and FIG. 9 is based on obtaining the component apparatus data 115 shown in FIG. 6 as the result of data being input to the input screen 31A as illustrated in FIG. 4. In other words, FIG. 11 and FIG. 12 illustrate the power supply allocation result data 117 in the course of processing.

Each time allocation of a power supply system that supplies power to a component apparatus corresponding to a proper name is decided, the second power supply allocation section 123 stores the corresponding power supply system name and a calculation result regarding the current value that is supplied in the memory, namely, the RAM 53.

First, at S13, the sorting section 121 determines that the processed number of power supplies=0 for the component apparatus with the proper name XXX#1 that is selected according to the sorting order.

Thereafter, at S14, since the processed number of power supplies=0 in the sorting process data 116 and the number of power supplies of the apparatus=2 for the target component apparatus with the proper name XXX#1, the first power supply allocation section 122 determines that the number of non-allocated power supplies is two.

Subsequently, at S15, since the power supply classification (200 V) of the power supply systems #1 to #3 is substantially the same as the power supply classification (200 V) of a power supply that should be supplied to the component apparatus that is the processing object, the second power supply allocation section 123 selects the plurality of power supply systems #1 to #3 as candidates.

Thereafter, at S17, since the current total (A) of each of the power supply systems #1 to #3 substantially equals zero, the second power supply allocation section 123 selects the power supply system with the power supply system ID=1, that is, the power supply system #1 that has the lowest identification number. Subsequently, at S19, the second power supply allocation section 123 allocates the power supply system #1 with respect to one of the non-allocated power supplies of the component apparatus with the proper name XXX#1. As a result, the power supply allocation result data 117 illustrated in FIG. 11A is obtained.

Next, the second power supply allocation section 123 increments the processed number of power supplies corresponding to the proper name in the sorting process data 116. More specifically, the second power supply allocation section 123 changes the value for processed number of power supplies of the component apparatus with the proper name XXX#1 from "0" to "1", and updates the processed number of power supplies.

Subsequently, at S14, based on the component apparatus data 115 and the sorting process data 116, the first power supply allocation section 122 recognizes that the number of power supplies to be allocated for the target component apparatus with the proper name XXX#1 is two, and the processed number of power supplies is one. In other words, the first power supply allocation section 122 determines that the number of non-allocated power supplies of the component apparatus with the proper name XXX#1 is one.

Thereafter, at S15, based on the power supply system data 114 and the component apparatus data 115, the second power supply allocation section 123 selects as candidates the power supply systems #1 to #3 which have substantially the same power supply classification as the power supply classification (200 V) of the remaining non-allocated power supply of the component apparatus with the proper name XXX#1. At S17, based on the total current (A) of the power supply allocation result data 117, the second power supply allocation section 123 determines that the surplus currents of the power supply system #2 and #3 are largest, with the current total (A) of each being substantially equal to zero. The second power supply allocation section 123 further selects the power supply system #2 as the allocation object according to the ascending order of the power supply system IDs.

Next, at S18, with respect to the selected power supply system #2, the second power supply allocation section 123 determines that the power supply system #2 is not allocated to the same component apparatus or an alternative device thereof. Thereafter, at S19, the second power supply allocation section 123 allocates the power supply system #2 selected at S17 with respect to the other non-allocated power supply of the component apparatus with the proper name XXX#1. As a result, the power supply allocation result data 117 illustrated in FIG. 11B is obtained.

Subsequently, at S14, based on the component apparatus data 115 and the sorting process data 116, the first power supply allocation section 122 recognizes that the number of power supplies to be allocated to the target component apparatus with the proper name XXX#1 is two, and that the processed number of power supplies is two. In other words, the first power supply allocation section 122 determines that allocation of power supply systems with respect to all power supplies of the target component apparatus with the proper name XXX#1 is decided.

Thus, at S13, based on the sorting process data 116, on the basis of the fact that the processed number of power supplies is zero for the component apparatus with the proper name XXX#2 that is next in the sorting order, the first power supply allocation section 122 determines that a power supply system has yet to be allocated thereto. At S14, based on the component apparatus data 115, the first power supply allocation section 122 further performs allocation processing with respect to two power supply systems based on the fact that the number of power supplies to be allocated to the component apparatus with the proper name XXX#2 is two.

Thus, at S15, based on the power supply system data 114 and the component apparatus data 115, the second power supply allocation section 123 selects the power supply systems #1 to #3 that have substantially the same power supply classification as the non-allocated power supply for the component apparatus with the proper name XXX#2. At S17, based on the power supply allocation result data 117 and the power supply system data 114, the second power supply allocation section 123 retrieves the power supply system with the largest surplus current among the power supply systems #1 to #3. More specifically, the second power supply allocation section 123 calculates that the current value total for each of the power supply systems #1 and #2 is 4.2 (A), and the current value total for the power supply system #3 is 0 (A). The second power supply allocation section 123 subtracts the respective total values from the contracted amperage of the power supply systems #1 and #2, and determines the power supply system with the largest surplus current. According to the present example, the second power supply allocation section 123 selects the power supply system #3.

Thereafter, at S18, with respect to the selected power supply system #3, the second power supply allocation section 123 determines that the power supply system #3 is not already allocated as a power supply system to the same component apparatus or to an alternative device thereof.

Next, at S19, the second power supply allocation section 123 allocates the power supply system #3 with respect to one of the non-allocated power supplies of the component apparatus with the proper name XXX#2. As a result, the power supply allocation result data 117 illustrated in FIG. 12A is obtained.

Subsequently, at S14, based on the component apparatus data 115 and the sorting process data 116, the first power supply allocation section 122 determines that the remaining number of non-allocated power supplies is one based on the fact that the number of power supplies to be allocated to the component apparatus with the proper name XXX#2 is two and the processed number of power supplies is one. The first power supply allocation section 122 carries out allocation of a power supply system with respect to the remaining other power supply to the component apparatus with the proper name XXX#2.

Thus, at S15, based on the power supply system data 114 and the component apparatus data 115, the second power supply allocation section 123 selects the power supply systems #1 to #3 that have substantially the same power supply classification as the non-allocated power supply with respect to the component apparatus with the proper name XXX#2. At S17, as illustrated in FIG. 12A, since the current total (A) is 4.2 for each of the power supply systems #1 to #3 in the power supply allocation result data 117, the second power supply allocation section 123 selects the power supply systems #1 to #3 as candidates.

Thereafter, at S18, based on the component apparatus data 115 and intermediate data of the power supply allocation result data 117, the second power supply allocation section 123 determines that the power supply systems #1 and #2 have already been allocated to power supplies of an alternative device (component apparatus with proper name XXX#1) of the component apparatus with the proper name XXX#2. Further, the second power supply allocation section 123 determines that the power supply system #3 has already been allocated as a power supply system with respect to the component apparatus with the proper name XXX#2.

Next, at S17, the second power supply allocation section 123 determines that power supply systems with the smallest allocated current total (A) have all been retrieved.

Thereafter, at S19, the second power supply allocation section 123 allocates one power supply system to the target component apparatus with the proper name XXX#2 from among the power supply systems #1 to #3 that are the three candidates. When the conditions are substantially the same for a plurality of the candidates, the power supply system that is allocated is a power supply system that is decided according to the power supply system IDs. More specifically, in FIG. 12A, the power supply system #1 is selected. As a result, the second power supply allocation section 123 allocates the power supply system #1 with respect to one of the non-allocated power supplies of the component apparatus with the proper name XXX#2. Consequently, the power supply allocation result data 117 illustrated in FIG. 12B is obtained.

Thereafter, the operation returns to the processing at S14 and the second power supply allocation section 123 performs allocation processing of power supply systems in a similar manner for the component apparatuses with the proper names ZZZ#1 to XXX#3. The second power supply allocation section 123 stores the power supply allocation result data 117 that is the result of allocating power supply systems in the design DB 11. As a result, the power supply allocation result data 117 illustrated in FIG. 8 is obtained. Consequently, at S19, the second power supply allocation section 123 ends allocation of power supply systems that supply power with respect to all component apparatuses.

Finally, at S14, based on the component apparatus data 115 and the sorting process data 116, the second power supply allocation section 123 determines that there are no non-allocated power supplies with respect to power supplies of the target component apparatus with the proper name XXX#3 (component apparatus that is last in the sorting processing order). Therefore, in at S13, based on the sorting process data 116, the first power supply allocation section 122 determines that the order of allocating power supply systems by sorting processing has been completed as far as the end, and thus ends the allocation processing of power supply systems.

When the power supply allocation result data 117 is stored in the design DB 11 after the power supply system generation section 12 has ended allocation processing of power supply systems that supply power for all component apparatuses, the drawing generation section 13 generates the drawing data 118 based on the power supply allocation result data 117. The drawing generation section 13 stores the generated drawing data 118 in the design DB 11. Based on the drawing data 118, the input/output processing section 14 displays and outputs the power supply system drawing shown in FIG. 9 on the monitor 58 of the input/output apparatus 3. The designer may thereby confirm the designed power supply system drawing.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

The invention claimed is:

1. A non-transitory computer-readable recording medium encoded with a computer program that causes a computer to execute a processing for aiding a design of a power supply in an apparatus, the computer program causing the computer to execute:
   extracting data of one of a plurality of power supplies of the apparatus from product data about the apparatus;
   extracting data of a power supply system from power supply system data, the power supply system is not allocated to any of the plurality of power supplies of the apparatus; and
   associating the extracted data of the one of the plurality of power supplies with the extracted data of the power supply system in power supply allocation result data.

2. The non-transitory computer-readable recording medium according to claim 1, wherein the computer program further causing the computer to execute:
   designing an intranet that includes a plurality of apparatuses and a plurality of power supply systems, whereby the apparatus is one of the plurality of apparatuses and the power supply system is one of the plurality of power supply systems.

3. The non-transitory computer-readable recording medium according to claim 1, wherein the extracting data of a power supply system comprises:
   extracting data of the power supply system which is not allocated to an alternative apparatus of the apparatus.

4. The non-transitory computer-readable recording medium according to claim 1, wherein the power supply system has a surplus current that is largest or a surplus electric power that is largest.

5. A method for causing a computer, which has a storage device, in aiding a design of a power supply of an apparatus, the method comprising:
   extracting data of one of a plurality of power;
   supplies of the apparatus from product data about the apparatus;
   extracting data of a power supply system from power supply system data, the power supply system is not allocated to any of the plurality of power supplies of the apparatus; and
   associating the extracted data of the one of the plurality of power supplies with the extracted data of the power supply system in power supply allocation result data.

6. The method according to claim 5, further comprising:
   designing an intranet that includes a plurality of apparatuses and a plurality of power supply systems, whereby the apparatus is one of the plurality of apparatuses and the power supply system is one of the plurality of power supply systems.

7. The method according to claim 5, wherein the extracting data of a power supply system comprises:
   extracting data of the power supply system which is not allocated to an alternative apparatus of the apparatus.

8. The method according to claim 5, wherein the power supply system has a surplus current that is largest or a surplus electric power that is largest.

9. A design apparatus for aiding a design of a power supply in an apparatus comprising:
   a design database to store product data about a plurality of apparatuses, power supply system data about power supply systems, and power supply allocation result data; and
   a processing section to extract data of a selected one of a plurality of power supplies of a selected one of the plurality of apparatuses from the product data, to extract data of a selected one of the power supply systems from the power supply system data, and to associate the extracted data of the selected one of the plurality of power supplies with the extracted data of the selected one of the power supply systems in the power supply allocation result data, whereby the selected one of the power supply systems is not allocated to any remaining ones of the plurality of power supplies of the selected one of the plurality of apparatuses.

10. The design apparatus according to claim 9, wherein the selected one of the power supply systems is not allocated to an alternative apparatus of the selected one of the plurality of apparatuses.

11. The design apparatus according to claim 9, wherein the selected one of the power supply systems has a surplus current that is largest or a surplus electric power that is largest.

* * * * *